Figure 1:
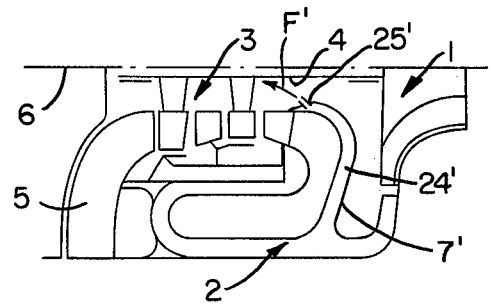

United States Patent [19]

Weiler

[11] 4,171,614
[45] Oct. 23, 1979

[54] GAS TURBINE ENGINE

[75] Inventor: Wolfgang Weiler, Dachau, Fed. Rep. of Germany

[73] Assignee: Motoren- und Turbinen-Union Munchen GmbH, Fed. Rep. of Germany

[21] Appl. No.: 787,101

[22] Filed: Apr. 13, 1977

[30] Foreign Application Priority Data

Apr. 17, 1976 [DE] Fed. Rep. of Germany ....... 2617024

[51] Int. Cl.² .............................................. F02C 7/18
[52] U.S. Cl. .................................. 60/39.36; 60/39.66; 415/138; 415/139
[58] Field of Search ................. 60/39.66, 39.36, 39.37; 415/115, 116, 137–139, 193

[56] References Cited

U.S. PATENT DOCUMENTS

| | | | |
|---|---|---|---|
| 3,034,298 | 5/1962 | White | 415/116 |
| 3,427,000 | 2/1969 | Scalzo | 415/116 |
| 3,575,528 | 4/1971 | Beam et al. | 415/116 |
| 3,583,824 | 6/1971 | Smuland et al. | 415/116 |
| 3,722,215 | 3/1973 | Zhdanov et al. | 60/39.36 |
| 3,892,497 | 7/1975 | Gunderlock et al. | 415/139 |

FOREIGN PATENT DOCUMENTS 2432092  6/1975  Fed. Rep. of Germany ........... 415/115

Primary Examiner—Robert E. Garrett
Attorney, Agent, or Firm—Craig and Antonelli

[57] ABSTRACT

A gas turbine engine which includes an essentially axial-flow compressor drive turbine having at least one turbine stator and at least one turbine rotor and a reverse-flow annular combustion chamber arranged coaxially with a longitudinal centerline of the gas turbine engine. The turbine stator and turbine rotor are arranged in the gas turbine engine and sized for heat retentivity such that thermal expansion rates of the turbine stator and turbine rotor are substantially equal.

13 Claims, 2 Drawing Figures

GAS TURBINE ENGINE

The present invention relates to an engine and, more particularly, to a gas turbine engine which includes an essentially axial-flow compressor drive turbine enclosed by a reverse-flow annular combustion chamber arranged coaxially with a longitudinal centerline of the gas turbine engine.

Low-powered gas turbine engines normally include a radial-flow compressor, a reverse-flow annular combustion chamber, and a compressor turbine arranged radially within the combustion chamber.

To attempt to achieve high-grade operating process cycles, for example, high specific output at low specific fuel consumption in low-powered gas turbines, it has been proposed to automatically decrease the dimensions of the compressor turbine, which results in an increase in the radial clearance between the rotor and the stator of the gas turbine engine, thereby considerably influencing the output and efficiency of the gas turbine engine.

In proposed gas turbine engines, the turbine stator is normally flanged to a casing of the engine by a radially flexible or elastic connecting structure. By virtue of such an arrangement, a free thermal expansion of the turbine stator is prevented, and such thermal expansion is governed instead mainly by the temperature distribution and the flexibility or elasticity of a system composed of the turbine stator, the flexible or elastic structural connection and the engine casing.

Additionally, as a result of the proposed flanging of the turbine stator to the casing of the engine, the radial clearance between the rotor and stator is governed essentially by an external flexibility of components which otherwise have no direct bearing on the stress and/or strain and thermal condition of the turbine.

Accordingly, in the proposed gas turbine engines, the entire gas turbine engine offers little thermal flexibility so that operation, in applications requiring frequent and rapid load variations, is inevitably accompanied by an increased radial clearance between the rotor and stator and a correspondingly low efficiency.

The aim underlying the present invention essentially resides in providing a gas turbine engine having a turbine stator arranged and sized for heat-retaining capacity, such that the progress of thermal expansion is the same or comparable in both the rotor and stator of the turbine, thereby ensuring an operation of the gas turbine engine with minimum radial clearances between the rotor and stator of the compressor turbine even with frequent and abrupt load variations.

According to one advantageous feature of the present invention, the stators of the compressor turbine are separated into individual blades or into groups of a few blades each with the individual blades or groups of blades being mounted in a longitudinally split casing fitted, on the one hand, with an additional shield to deflect heat from a combustion chamber area and, on the other hand, connected to the outer casing of the gas turbine engine in a plane behind the combustion chamber by a plurality of radially extending bolts.

By virtue of the connection of the present invention, it is ensured that the longitudinally split casing of the turbine stator and the guide blades can expand freely with no interference from forces and distortions originating in the casing of the gas turbine engine.

According to a further feature of the present invention, an annular chamber is formed by the turbine stator casing and a casing shell or shield interposed between the combustion chamber and the stator casing with the annular chamber being charged with air from a compressor outlet. The air from the compressor outlet flows through the stator casing by way of a plurality of radial ports so as to ventilate the stator and also cool the turbine guide blades.

By virtue of the provision of the annular chamber, it is possible to tune the degree and rate of thermal expansion of the turbine stator optimally to the expansion of the turbine rotor so that, even with sudden load variations, the gas turbine engine can be operated with very limited radial clearances over a wide range, with correspondingly positive effects on turbine efficiency and, therefore, on specific fuel consumption and specific power.

According to yet another feature of the present invention, the casing shell or shield is arranged at a radial distance from the turbine casing so as to define a continuation of the combustion chamber outer casing between the flame tube of the reverse-flow annular combustion chamber and the turbine stator casing.

Preferably, according to the present invention, the annular chamber formed between the turbine stator casing and the casing shell or shield communicates with an air duct formed between the outer casing of the gas turbine engine and the flame tube of the reverse-flow combustion chamber and also with air chambers which are essentially closed on one side by the casing shell or shield and on the other side by outer bands of guide blades and shroud segments.

Advantageously, according to the present invention, the guide blades and the shroud segments are conventionally held one to the other by collar-shaped projections and recesses and to the casing of the turbine stator with axial and radial clearances.

Accordingly, it is an object of the present invention to provide a gas turbine engine which avoids by simple means the drawbacks and shortcomings encountered in the prior art.

A further object of the present invention resides in providing a gas turbine engine which ensures operation with minimum radial clearances between the rotor and stator of the compressor turbine with frequent and abrupt load variations.

Yet another object of the present invention resides in providing a gas turbine engine wherein the casing of the turbine stator and guide blades can freely expand with no interference from forces and distortions originating in the casing of the gas turbine engine.

A still further object of the present invention resides in providing a gas turbine engine which offers a maximum thermal flexibility.

Another object of the present invention resides in providing a gas turbine engine which has diverse applications as, for example, a power plant for aircraft, motor vehicles, tanks, and ships, as well as for stationary applications.

Figure 2:
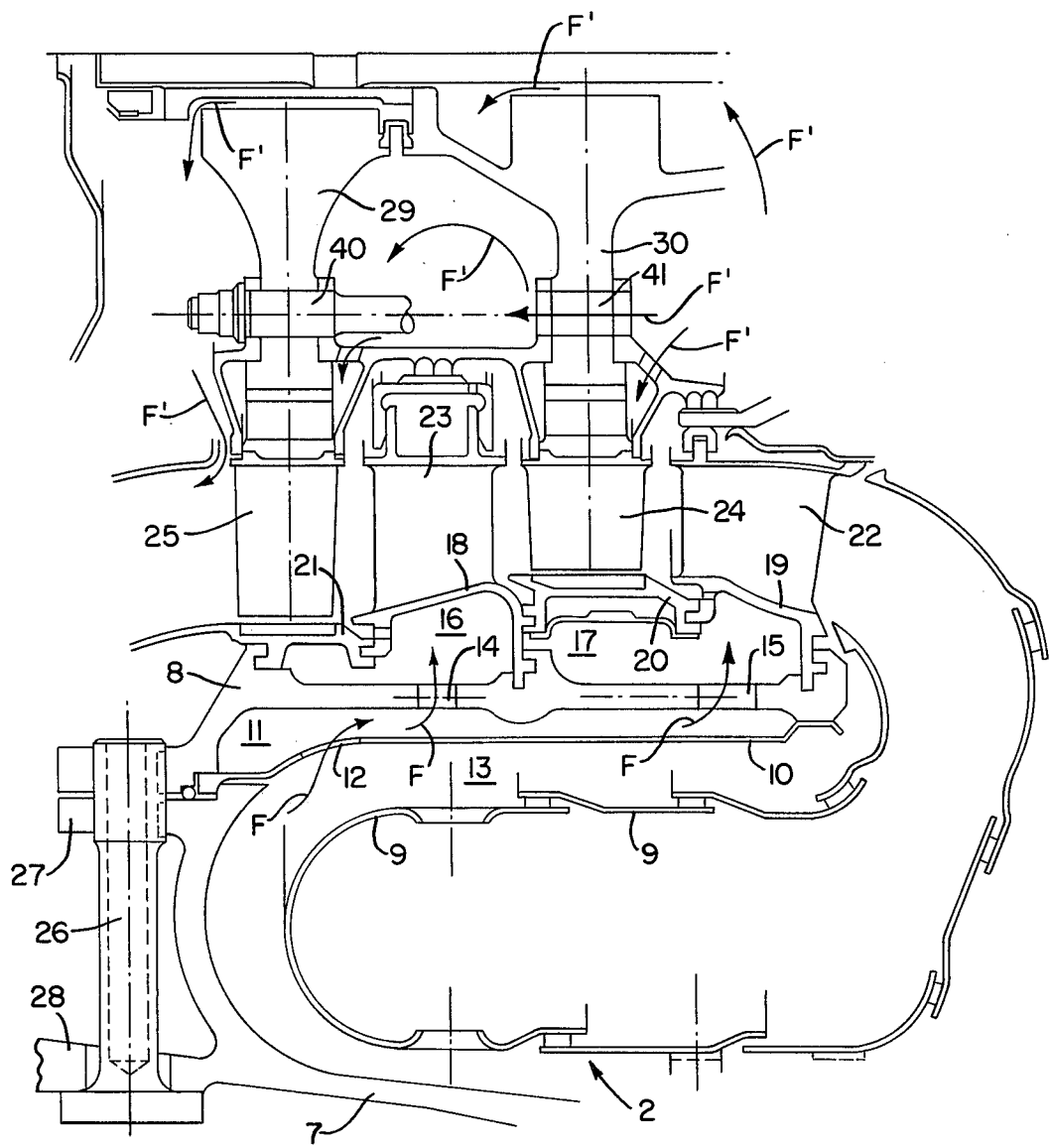

These and other objects, features and advantages of the present invention will become more apparent from the following description when taken in connection with the accompanying drawings which show, for the purposes of illustration only, one embodiment of a gas turbine engine in accordance with the present invention, and wherein:

FIG. 1 is a schematic axial section of the lower half of a gas turbine engine in accordance with the present invention; and FIG. 2 is an enlarged detailed view of the gas turbine engine of FIG. 1, essentially illustrating a portion of a reverse-flow annular combustion chamber including a compressor drive turbine.

Referring now to the drawings wherein like reference numerals are used in both views to designate like parts and, more particularly, to FIG. 1, according to this figure, a schematically illustrated gas turbine engine includes, from right to left, a radial-flow compressor generally designated by the reference numeral 1, an annular reverse-flow combustion chamber generally designated by the reference numeral 2, and an axial-flow turbine generally designated by the reference numeral 3 driving the compressor with the compressor drive turbine 3 and radial-flow compressor 1 being mounted on a common shaft 4.

A turbine exhaust duct 5 is provided and communicates in a known manner with an exhaust system (not shown) of the gas turbine engine.

As shown more clearly in FIG. 2, the compressor drive turbine 3 of the gas turbine engine is surrounded by the reverse-flow annular combustion chamber 2 extending coaxially with a longitudinal centerline 6 (FIG. 1) of the engine with a portion of an outer casing 7 of the engine serving simultaneously as an outer casing of the reverse-flow annular combustion chamber 2.

An annular shield or casing shell 10 is arranged at a radial distance from a longitudinally split turbine stator casing 8 in continuation of the outer casing 7 of the gas turbine engine and is disposed between a flame tube 9 of reverse-flow annular combustion chamber 2 and the turbine stator casing 8 of the turbine stator 1. An annular chamber 11 is formed between shield 10 and turbine stator casing 8 with the chamber 11 communicating with an air duct 13 formed between the outer casing 7 and flame tube 9 of reverse-flow combustion chamber 2 by way of at least one port or opening 12 arranged in the shield 10.

The annular chamber 11 communicates with air chambers 16, 17 by way of ports or openings 14, 15 provided in the turbine stator casing 8 with the air chambers essentially being enclosed by turbine stator casing 8 and by outer guide blade bands 18, 19 and shroud segments 20, 21.

In the illustrated embodiment, the turbine guide blades or stators 22, 23 are formed as individual vanes with rotor blades 24, 25 being arranged on respective sides of the stator blade 23.

As shown in FIG. 2, and flow F of cooling air is directed from air duct 13 to air chambers 16, 17 through annular chamber 11 with the cooling air being used to cool guide blades or stators 22, 23. A further flow F' of cooling air passes primarily over two rotor disks 29, 30 of compressor drive turbine 3 so as to cool the rotor blades 24, 25.

The outer guide blade bands 18, 19 and shroud segments 20, 21 are held together by collar-shaped projections and mounted on turbine stator casing 8 with axial and radial play.

Radially extending bolts 26 are provided for attaching turbine stator casing 8 to outer casing 7. The bolts 26 are secured to the turbine stator casing 8 and are mounted on axially projecting flanges 27 or sections 28 of outer casing 7 of the engine so that longitudinally split turbine stator casing 8 can expand freely. Moreover, the attachment by the bolts 26 facilitates separation of turbine stator casing 8 from outer casing 7.

This further cooling air F' can be discharged through an opening 25' (FIG. 1) in an outer casing section 7' of the combustion chamber 2. Said section 7' defining an air duct 24' for cooling purposes of the flame tube 9 and further being served with air from the radial-flow compressor 1.

Reference numeral 40 (FIG. 2) shows one of several bolts for the interconnection of the two rotor disks 29, 30. These bolts 40 should be arranged equidistantly.

Reference numeral 41 shows one of several cooling flow passages of the rotor disk 30 being arranged equidistantly between said bolts 40.

While I have shown and described only one embodiment in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A gas turbine engine comprising:
    an essentially axial-flow compressor drive turbine means including at least one turbine stator means and at least one turbine rotor means, wherein the turbine stator means and turbine rotor means are arranged for free thermal expansion in the gas turbine engine and are dimensioned such that thermal expansion rates of the turbine stator means and turbine rotor means are substantially equal,
    a reverse-flow annular combustion chamber means arranged coaxially with a longitudinal centerline of the gas turbine engine,
    an outer casing means arranged coaxially with the longitudinal centerline of the gas turbine engine in such a manner so as to simultaneously serve as an outer casing for the reverse-flow annular combustion chamber means,
    a longitudinally split turbine stator casing means,
    said turbine stator means comprising individual guide blades mounted in the longitudinal split turbine stator casing means, outer guide blade bands provided for the guide blades, and shroud segments provided for turbine rotor blades of the turbine rotor means,
    collar-shaped projection means provided on one of the outer guide blade bands and the shroud segment and recess means provided on the other of said outer guide blade bands and shroud segments for connecting the outer guide blade bands to the shroud segments and to the longitudinally split turbine stator casing means with axial and radial play,
    a means for mounting said turbine stator casing means at the outer casing means of the gas turbine engine so as to allow a free expansion of said turbine stator casing means with respect to said outer casing means, the mounting means lying in a plane behind said reverse-flow annular combustion chamber means, and
    a shield means forming a continuation of said outer casing means said shield means being arranged at a radial distance from said turbine stator casing means.

2. The gas turbine engine according to claim 1, wherein the reverse-flow annular combustion chamber means includes a flame tube.

3. The gas turbine engine according to claim 2, wherein said shield means is disposed between said flame tube and said turbine stator casing means for defining with said turbine stator casing means an annular chamber means for receiving cooling air.

4. The gas turbine engine according to claim 3, wherein said shroud segments and said outer guide blade bands are arranged with respect to each other and to said turbine stator casing means so as to define at least one air chamber for cooling said at least one turbine stator means, and means are provided for communicating said annular chamber means with said at least one air chamber.

5. The gas turbine engine according to claim 3, wherein said means for mounting said turbine stator casing means on said outer casing means includes at least one axially projecting flange provided on said outer casing means, at least one radially extending bolt means secured to said turbine stator casing means, and means provided in said axially projecting flange for accommodating said bolt means.

6. The gas turbine engine according to claim 5, wherein said outer casing means includes an outer casing section defining an outer surface of said outer casing means, said axially projecting flange being arranged on said outer casing means at a position spaced radially inwardly from said outer casing section, and wherein means are provided in said outer casing section for accommodating said bolt means.

7. The gas turbine engine according to claim 1, wherein said means is for mounting said turbine stator casing means arranged as an axial extension of the outer casing means of the gas turbine engine.

8. The gas turbine engine according to claim 1, wherein the reverse-flow annular combustion chamber means includes a flame tube, and wherein said shield means is disposed between said flame tube and the turbine stator casing means for defining with the turbine stator casing means an annular chamber means for receiving cooling air, means communicating with said annular chamber means are provided for supplying the cooling air to said annular chamber means.

9. The gas turbine engine comprising:
an essentially axial-flow compressor drive turbine means including at least two axially spaced turbine stators and at least two axially spaced turbine rotors, wherein the turbine stators and turbine rotors are arranged for free thermal expansion in the gas turbine engine and are dimensioned such that thermal expansion rates of the turbine stators and turbine rotors are substantially equal,
a reverse-flow annular combustion chamber means arranged coaxially with a longitudinal centerline of the gas turbine engine, one of said turbine stators being arranged between said reverse-flow annular combustion chamber means and a first of said turbine rotors, the other of said turbine stators being arranged between said first of said turbine rotors and the other of said at least two turbine rotors, each of said turbine stators including an outer guide blade band,
an outer casing means arranged coaxially with the longitudinal centerline of the gas turbine engine in such a manner so as to simultaneously serve as an outer casing for the reverse-flow annular combustion chamber,
a longitudinally split turbine stator casing means,
shroud segment means associated with said outer guide blade bands and said turbine stator casing means for defining at least two individual air chamber means for cooling said stator blades, means for supplying a flow of cooling air to said at least two individual air chamber means,
means for mounting said turbine stator casing means at the outer casing means of the gas turbine engine so as to allow a free expansion of said turbine stator casing means with respect to said outer casing means, the mounting means lying in a plane behind said combustion chamber means, and
a shield means forming a continuation of said outer turbine casing, said shield means being arranged at a radial distance from said turbine stator casing means.

10. The gas turbine engine according to claim 9, wherein said means for supplying a flow of cooling air includes an annular chamber means communicating with said at least two individual air chamber means and formed between said reverse-flow annular combustion chamber means and said turbine stator casing means, and an air duct means for directing a flow of cooling air to said annular chamber means.

11. The gas turbine engine according to claim 10, wherein an outer casing means surrounds the gas turbine engine in such a manner so as to simultaneously serve as an outer casing for the reverse-flow annular combustion chamber means, and wherein means are provided for mounting said turbine stator casing means at the outer casing means of the gas turbine engine so as to allow free expansion of the turbine stator casing means with respect to the outer casing means of the gas turbine engine.

12. The gas turbine engine according to claim 11, wherein said means for mounting said turbine stator casing means includes axially projecting flange means provided on said outer casing means, radially extending bolt means secured to said turbine stator casing means, and means provided in said axially projecting flange means for accommodating said bolt means.

13. The gas turbine engine according to claim 3, further comprising means formed between said outer casing means and said flame tube for directing a flow of cooling air to said annular chamber means, and means for communicating said annular chamber means with said directing means.

* * * * *